(12) United States Patent
Tymes

(10) Patent No.: US 6,487,454 B1
(45) Date of Patent: Nov. 26, 2002

(54) PROGRAMMABLE-SHAPE ARRAY

(76) Inventor: Adrian Tymes, 2375 Adele Ave., Mountain View, CA (US) 94043

( * ) Notice: Subject to any disclaimer, the term of this patent is extended or adjusted under 35 U.S.C. 154(b) by 0 days.

(21) Appl. No.: 09/259,935

(22) Filed: Mar. 1, 1999

(51) Int. Cl.[7] .............................................. G05B 19/18
(52) U.S. Cl. ........................................................ 700/2
(58) Field of Search ...................... 700/1, 2; 74/490.03; 244/219; 409/201, 235

(56) References Cited

U.S. PATENT DOCUMENTS

| 5,259,710 A | * | 11/1993 | Charles | 409/235 |
| 5,386,741 A | * | 2/1995 | Rennex | 74/490.05 |
| 5,392,663 A | * | 2/1995 | Charles | 74/490.03 |
| 5,531,407 A | * | 7/1996 | Austin et al. | 244/219 |
| 5,659,477 A | * | 8/1997 | Collins | 700/95 |
| 5,771,747 A | * | 6/1998 | Sheldon | 74/490.01 |
| 5,988,845 A | * | 11/1999 | Murata | 700/2 |
| 6,155,758 A | * | 12/2000 | Wieland et al. | 409/201 |
| 6,211,960 B1 | * | 4/2001 | Hembree | 356/400 |
| 6,233,502 B1 | * | 5/2001 | Yim | 700/245 |

* cited by examiner

Primary Examiner—Thomas Black
Assistant Examiner—Ronald D Hartman, Jr.
(74) Attorney, Agent, or Firm—Swernofsky Law Group PC

(57) ABSTRACT

An array of devices connected to each other, in a grid or other fashion, which are able to adjust their position and/or orientation relative to one another, in order to alter the overall structure that the devices form. Also, a controller that can determine this structure from data provided by the devices, and tell each device what relative position and orientation it should be in so that the overall structure changes to some other desired shape.

20 Claims, 1 Drawing Sheet

PROGRAMMABLE-SHAPE ARRAY

BACKGROUND OF THE INVENTION

1. Field of the Invention

This invention relates to tools.

2. Related Art

The number and variety of tools that have been made and used is beyond count and many tools are best suited for a particular purpose or job. A hammer is better suited to pounding nails than a screwdriver, and turning screws is difficult with a hammer's claw.

Unfortunately, many modern tasks can not be accomplished with just one tool. Assembling simple pre-fabricated fixtures often requires both a hammer and a screwdriver. Building furniture from lumber may require a hammer, a saw, a measuring tape, and some way to record and mark appropriate lengths.

Some tasks require instruments that are unique to the task. These tools can be expensive and hard to find. Many tasks require tools that are similar to others, but sufficiently different that attempting to use the same tool for both tasks is impracticable—for example, turning a flat head screw with a phillips head screwdriver.

Often, the only solution is to purchase a tool for each required purpose. Some tools may be unique, so that the user must have one specially made. There have been many attempts to solve these problems. A first known solution is to create drills with modular heads, and rapid prototyping for tools no one has yet built.

While this does assist in solving the problems associated with the plethora of available tools, all have required at least one physical token for each tool required.

A second known solution is the attempt to make single tools that are physically adjustable to each task for example, wrenches with gears that can be turned by hand to adjust their size, or multiple tools combined into a single unit like a Swiss army knife.

While these types of tools can provide more than one configuration they suffer from severe drawbacks. First, these tools have a preset number of forms, all of which must be designed before the tool is built and purchased. Second, these tools require the user to manipulate the tool until it is in the desired shape.

Accordingly, it would be desirable to provide a technique for dynamically configuring tools that are not subject to the limitations of the known art.

SUMMARY OF THE INVENTION

The invention provides an array of panel components able to move themselves relative to each other, along with a computer controller to coordinate this movement. The array can assume practically any form allowing it to function as many different tools. Once a tool is created in the array, its form may be stored and recalled for later use, thus entire lists of selectable tools may be created.

Each panel component is connected to other panel components by connectors attached to ball joints at each panel component. Each panel component is associated with a processor that receives positioning data from sensors located at each ball joint. Positioning data are sent to and from the controller such that motors may control the position of each ball joint and the relative position of each panel component.

A "limp mode" is provided so an operator may manually adjust the panel components to a desired form and then record the configuration for later use. A user interface is also provided at the controller to allow the user to select pre-defined array configurations.

With the help of computer aided design, professional tool makers may prototype new tools without the expense of creating molds or carving a sample out of blocks of wood, metal, or plastic. New tools may be tested simply by configuring an array into whatever shape is desired and storing that shape in the array's controller. Anyone with an array but without the appropriate structure on hand may obtain the data necessary to program the array from another party.

DETAILED DESCRIPTION OF THE PREFERRED EMBODIMENT

Figure 1:
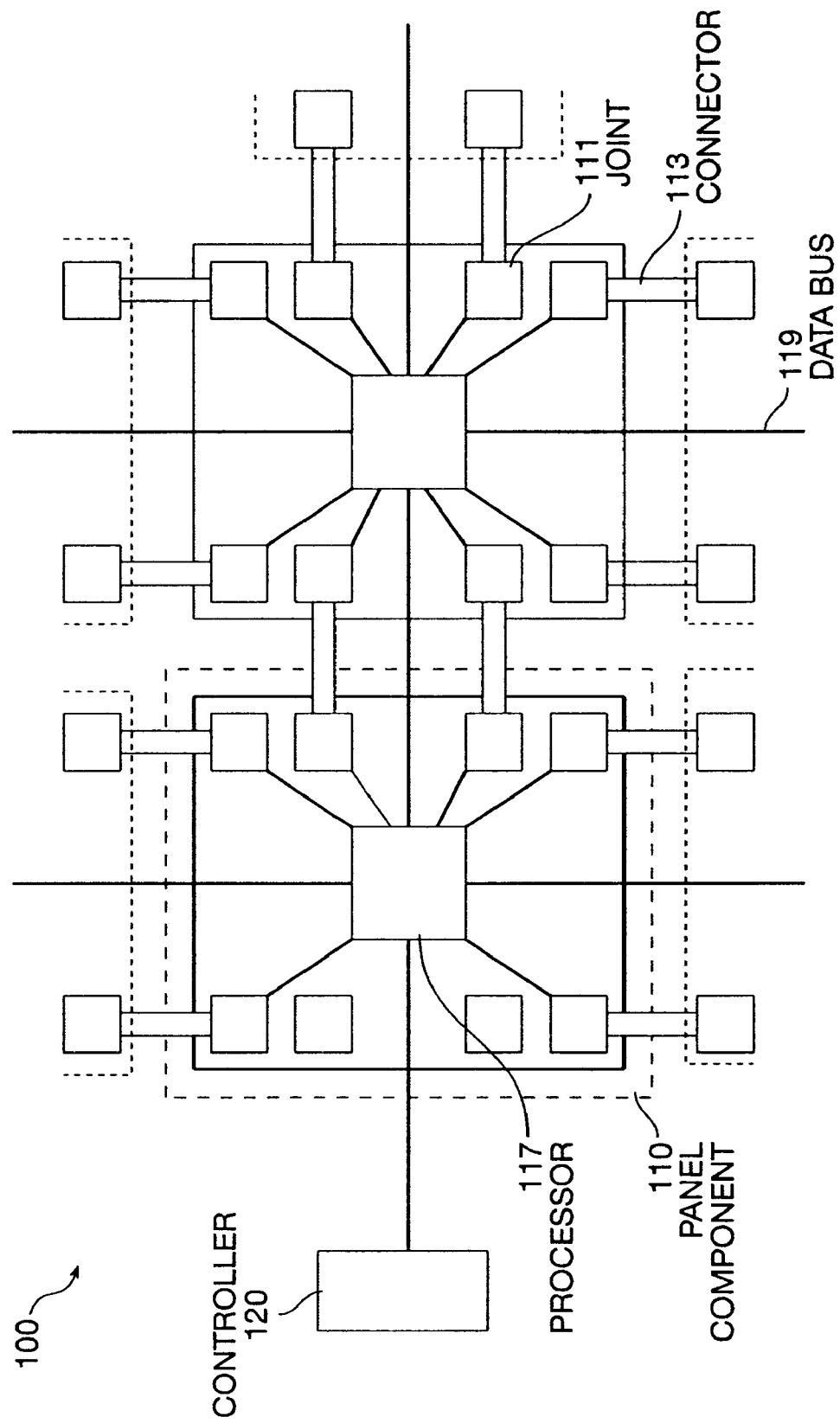
FIG. 1 shows a block diagram of a system for a programmable shape array.

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

System Elements

FIG. 1 shows a block diagram of a system for a programmable shape array.

A system 100 includes a plurality of panel components 110 and a controller 120.

Each panel component 110 includes a plurality of joints 111, a plurality of connectors 113, a plurality of motors 115, a processor 117, and a data bus 119.

The plurality of joints 111 include a plurality of rotatable joints. Each joint 111 includes a sensor 112 (not shown but understood by those skilled in the art) capable of determining the angle at which a connector 113 is directed. In a preferred embodiment, the plurality of joints 111 are ball sockets. There is no requirement that the plurality of joints 111 are ball sockets, and hinges and other similar elements may be used.

In a preferred embodiment, the plurality of connectors 113 include connectors of sufficient length to connect from one joint 111 to another joint 111. In an alternative embodiment one joint 111 may connect directly to another joint 111 without the use of a connector 113.

In a preferred embodiment, the plurality of motors 115 include a plurality of electric motors (not shown but understood by those skilled in the art). There is no requirement that electric motors be used. Other types of powered motors and magnetos may be used. In a preferred embodiment, each joint 111 has one of the plurality of motors 115 controlling it. Each of the plurality of motors 115 is preferably contained within a respective joint 111 or within relatively close proximity to a joint 111.

A processor 117 includes an integrated circuit (not shown but understood by those skilled in the art) capable of receiving data from a sensor 112.

The controller 120 includes a processor, a main memory, and software for executing instructions (not shown, but understood by those skilled in the art). This software preferably includes software for managing elements in the system 100 in accordance to the invention and further explained below. The controller 120 may include a palm top computer or other computing device.

The data bus 119 allows data from the sensors 112 to be transmitted to and from the controller 120 via the processor 117.

Array Configuration

Panel components 110 are arranged as an array such that they are interconnected.

In an alternative embodiment, panel components 110 may possess voltage sensors for a voltmeter that once attached to one end of a standard sized component to be measured can automatically attach itself to the other end.

In a third embodiment, an array may be a three dimensional lattice of cubes or pyramids with single variable-length connectors, or a long string that doubles back and wraps around itself to adjust its width and depth. The components do not need to be exact copies of each another. Furthermore, the components do not need to have the same set of connections, and they may be dynamically linked and de-linked with components that become neighbors through shape changes.

System Operation

For each configuration of the programmable array, the controller 120 sends positioning data to each processor 120 whose panel component 110 must be moved. The positioning data is passed by the processor 117 to the sensors 112 at the joints 111, and the motors 115 move the joints 111 so that the connectors 113 are at the angle designated by the positioning data.

New configurations may be programmed at the controller 120 by entering new positioning data in the form of angles for the joint 111/connector 113 assembly. A "limp mode" is also provided such that each panel component can be manually positioned to conform to a configuration desired by an operator. The "limp mode" may be used in conjunction with an already defined configuration for modification purposes. Position data derived from the "limp mode" may be saved by the controller and recalled at another time to recreate the configuration.

Each panel component of an array needs only to know where it must be relative to its neighbors. For example, if each of thirteen panel components 110 in a line turn 7.5 degrees on the same axis relative to adjacent panel components 110, that results in 12 * 2 * 7.5=180 degrees (12 connections between thirteen components in a row; each connection has 2 ends; each end turns 7.5 degrees), thus turning a straight line back on itself a short distance away. If the individual components are small enough, this will be just a line, which ends as far as any significantly larger system is concerned. For example, if the components are 0.1 millimeter cubes, several lines next to each other making 180 degree turns as described above can form a flat head screwdriver's end and fit within a 1 millimeter gap in a screw head.

Generality of the Invention

The invention has applicability and generality to applications including research and development of tools and other static devices.

Alternative Embodiments although preferred embodiments are disclosed herein, many variations are possible which remain within the concept, scope, and spirit of the invention, and these variations would become clear to those skilled in the art after perusal of this application.

What is claimed is:

1. A programmable shape array, including
   a plurality of dynamically linkable and delinkable devices, said plurality of devices intercoupled in some combination of serial and parallel to form an array having at least two dimensions, wherein each device in said plurality of devices includes a panel with at least one contiguous edge and at least one planar surface;
   a computer controller coupled to said array of devices, said controller being capable of configuring said array such that each of said devices may be individually repositioned at any angle relative to any other device; said services forming any of a plurality of hand tools,
   a data bus disposed for communication between said array of devices and said computer controller.

2. The apparatus of claim 1, wherein each device included in said plurality of devices comprises
   a first panel having a set of joints wherein each one of said joints is rotatably coupled to at least one of a set of connectors at a first end of said connectors;
   a set of motors wherein each motor is operably coupled to at least one of said joints;
   a set of sensors individually coupled to at least one of said joints;
   a set of processors wherein at least one processor is connected with said first panel, said processor in communication with said sensors using said data bus;
   a computer controller in communication with said processor using said data bus; and
   a second panel having a set of second joints whereby at least one of said second joints is connected to at least one of said connectors at a second end of said connector.

3. The apparatus of claim 2, wherein each said joints are ball joints.

4. The apparatus of claim 2, wherein said sensors are operably connected to detect the angle of said joints.

5. The apparatus of claim 4, wherein said sensors transmit angle data to said processor via said data bus.

6. The apparatus of claim 5, wherein said processor is capable of communication with said computer controller via said data bus.

7. The apparatus of claim 1 wherein, said devices include one or more voltage sensors disposed to analyzing electrical properties; where upon attaching a first voltage sensor to a first end of a standard sized electrical component a second voltage sensor can automatically attach to a second end of said electrical component.

8. The apparatus of claim 7, wherein a value for said electrical component is received at said computer controller by transmission through said data bus.

9. A method of operating a programmable shape array including
   defining a shape for said array, said array having a plurality of intercoupled devices in some combination of serial and parallel having at least two dimensions of variation; and
   configuring said array, said configuring including linking and delinking said devices to conform statically to said shape, said shape forming any of a plurality of hand tools.

10. The method of claim 9, wherein said defining further includes entering angle data into said computer controller; and recording angle data at said computer controller, wherein said recording is responsive to an operator positioning panels in said array.

11. The method of claim 10, wherein an operator enters and stores said angle data at said computer controller.

12. The method of claim 11, wherein said joints reposition said panels responsive to said angle data.

13. The method of claim 12, wherein said angle data is sent by said computer controller to said joints using said data bus.

14. The method of claim 10, wherein said array is placed in a passive mode, said passive mode allowing said joints to be repositioned manually by an operator.

15. The method of claim 14, wherein sensors associated with said joints generate angle data responsive to repositioning said joints.

16. The method of claim 15, wherein said angle data is passed through a processor associated with said joint and received at said computer controller using said data bus.

17. The method of claim 16, wherein said angle data is saved at the computer controller.

18. The method of claim 9, wherein said configuring includes replaying angle data previously defined and stored at said computer controller.

19. The method of claim 18, whereby said angle data is transmitted to said array, said transmitting including angle data passing from said computer controller through a processor associated with said panel and received at an associated joint using a data bus.

20. The method of claim 18, wherein joints reposition said panels responsive to said angle data.

* * * * *